United States Patent
Varnham et al.

[11] Patent Number: 5,540,094
[45] Date of Patent: Jul. 30, 1996

[54] SCALE FACTOR COMPENSATION FOR PIEZO-ELECTRIC RATE SENSORS

[75] Inventors: Malcolm Varnham; Timothy S. Norris; James McInnes; Diana Hodgins, all of Herts, Great Britain

[73] Assignee: British Aerospace Public Limited Company, London, United Kingdom

[21] Appl. No.: 188,326

[22] Filed: Jan. 24, 1994

Related U.S. Application Data

[63] Continuation-in-part of Ser. No. 810,416, Dec. 20, 1991, abandoned.

[30] Foreign Application Priority Data

Dec. 22, 1990 [GB] United Kingdom ............... 9027992

[51] Int. Cl.⁶ ....................... G01P 3/44; G01C 19/00
[52] U.S. Cl. ............... 73/504.13; 73/1 D; 73/1 DV; 73/579
[58] Field of Search ............... 73/505, 504, 1 E, 73/1 D, 1 DV, 579, 504.13

[56] References Cited

U.S. PATENT DOCUMENTS

| | | | |
|---|---|---|---|
| 4,079,630 | 3/1978 | Friedland et al. | 73/505 |
| 4,655,081 | 4/1987 | Burdess | 73/505 |
| 4,671,112 | 6/1987 | Kimura et al. | 73/505 |
| 5,012,174 | 4/1991 | Adkins et al. | 73/505 |
| 5,218,867 | 6/1993 | Varnham et al. | 73/505 |

FOREIGN PATENT DOCUMENTS

| | | |
|---|---|---|
| 2061502 | 5/1981 | United Kingdom . |
| 0153189 | 8/1985 | United Kingdom . |
| 0411849 | 2/1991 | United Kingdom . |
| 2251072 | 6/1992 | United Kingdom . |

OTHER PUBLICATIONS

D. G. Harris, "Start a broad application spectrum Gyro for the 1990's", IEEE position location and navigation symposium, Mar. 1990, pp. 21–28.

*Primary Examiner*—Hezron E. Williams
*Assistant Examiner*—Richard A. Moller
*Attorney, Agent, or Firm*—Cushman, Darby & Cushman

[57] ABSTRACT

A method of and apparatus for scale factor compensation for piezo-electric rate sensors maintains the magnitude of vibration at a primary pick-off point substantially constant to enable one of the variables of a vibrating structure—the piezo-electric charge coefficient $\beta$ to be determined, and thereby enables variation of the scale factor of the sensor from a calibrated value to be determined. This enables correction of the sensor output by a computational scale factor control unit to ensure that the output therefrom allows for a more accurate sensor. Thus, sensors are provided for applications requiring a higher degree of accuracy than they were previously able to provide for.

16 Claims, 3 Drawing Sheets

5,540,094

SCALE FACTOR COMPENSATION FOR PIEZO-ELECTRIC RATE SENSORS

This is a continuation-in-part of application Ser. No. 07/810,416 filed Dec. 20, 1991, now abandoned.

FIELD OF THE INVENTION

The present invention relates to piezo-electric rate sensors and relates more particularly to a method of and apparatus for scale factor compensation for piezo-electric rate sensors.

BACKGROUND OF THE RELATED ART

There are currently a number of piezo-electric vibrating rate sensors being produced for different applications. For instance, piezo-electric vibrating rate sensors are described for use as gyroscopic devices in U.S. Pat. No. 4,655,081, the teachings of which are incorporated herein by this reference. Generally, the vibrating portion of the sensor is made from a man-made material whose properties vary with both temperature and time.

Properties of the vibrating structure vary with both temperature and time. These variations result in a difference between the indicated rate and the actual rate. Therefore a difference exists between the indicated rate of the sensor as determined by demodulating the output signal from the secondary mode of vibration, and the actual rate. These variations make such sensors unsuitable for many applications in which a high degree of accuracy is required.

One method of avoiding the above mentioned problem is to monitor the temperature and time and compensate the output of the rate sensor with a scale factor. Unfortunately, the material properties of the sensors are not exactly reproducible from batch to batch and hence differing variations in the rate sensor and thus the scale factor still present themselves.

Conventionally, a stablized scale factor for the rate sensor is determined by arranging a feedback loop which maintains the output of the primary pick-off amplitude constant as temperature and time change. However, this method does not fully stablize the scale factor. It improves the scale factor stability, but there is still, for typical piezo-electric materials, about a ±5% variation in the scale factor due to temperature which is not compensated for using the conventional method.

Therefore, there exists a requirement for a method of and apparatus for obtaining the value of those parameters of a piezo-electric rate sensor which vary with both temperature and time so as to enable an accurate scale factor compensation to be achieved and hence ensure the accuracy of the sensor.

SUMMARY OF THE INVENTION

The present invention solves the above-mentioned and other problems by providing a method of and apparatus for scale factor compensation which improves the conventional accuracy of piezo-electric rate sensors and the like to enable such sensors to be used in applications in which they were previously considered unsuitable for.

The properties of the vibrating structure which vary with time and/or temperature are: i) the piezo-electric charge coefficient ($\beta$); ii) the resonance at the operational frequency (Q factor); and iii) the natural resonant frequency of the vibrating structure Wn.

The scale factor is dependent upon each and every one of these variables, and it is conventionally impossible to accurately determine the value of the scale factor, and hence impossible to accurately compensate for the variation in the demodulated output of the rate sensor.

Thus, the scale factor of the rate sensor is a function of Q, $\beta$ and Wn. Conventional scale factor compensation methods employ maintaining the amplitude of the primary pick-off point as a constant to determine the scale factor, but the scale factor is a different function of Q, $\beta$ and Wn from that of the primary pick off amplitude, the problem which is overcome by the present invention.

The present invention provides an apparatus and method for performing three independent measurements to determine the three variables Q, $\beta$ and Wn, which in turn determine the scale factor. These three measurements are: i) the ratio of the primary pick-off point $P_p$ to the primary drive point $P_D$; ii) the natural resonant frequency of the vibrating structure Wn; and iii) the elements of the drive current to the vibration device (the current to the primary drive electrode) to determine the power dissipation.

Along with these three measurements, the value of the piezo-electric charge coefficient of the vibrating structure, which varies with temperature, is determined by maintaining the magnitude of vibration at the primary pick-off point substantially constant. By maintaining the level measured at the primary pick-off point to be constant, the overall scale factor is desensitized to changes in the variables $\beta$ and Wn. This approach is applicable to both open and closed loop vibrating structure rate sensors.

Secondary mode vibration measuring electrodes are provided for measuring the magnitude of a secondary mode of vibration $S_p$. The scale factor is defined as the signal at the secondary pick off $S_p$, divided by the applied rate of turn as determined at calibration, given by the following equation:

$$\text{Scale factor} = S_p/\Omega = A\, P_d\, \beta_{11}\, \beta_{14}(Q/W_n)^2 k$$

Since A and k are constants of the system, determined by calibration, and Q and W have been determined, $\beta_{11}$, $\beta_{12}$, $\beta_{13}$ and $\beta_{14}$ can be assumed to have the same temperature and time characteristics which allows the scale factor to be calculated for all values of Q, W and $\beta$.

Accordingly, the present invention provides a method of in process scale factor compensation for a piezo-electric rate sensor comprising the steps of activating a vibration device so as to stimulate the vibration of a vibratable structure at a primary drive point thereon; monitoring the magnitude of vibration at a primary pick-off point on the structure; comparing the magnitude of vibration at the primary pick-off point with a reference value; varying the output of a vibration means to vary the magnitude of vibration at the primary drive point in a way which maintains the magnitude of vibration at the primary pick-off point substantially constant.

By maintaining the magnitude of vibration at the primary pick-off point substantially constant, it is possible to determine the value of the piezo-electric charge co-efficient for the vibrating structure, which varies with temperature, and hence facilitates the determination of the scale factor compensation for the sensor to obtain accurate results therefrom. Preferably, the magnitude of vibration at the primary pick-off point is monitored by the amplitude of a voltage signal from a vibration monitoring electrode. The amplitude from the vibration monitoring electrode is then compared with a predetermined value. Preferably, the vibration of the vibration device is varied by altering the amplitude of the voltage of a signal supplied to the vibration device at the primary drive point.

According to a second aspect of the present invention, there is provided a piezo-electric vibrating rate sensor comprising a vibrating structure, vibration device for vibrating the structure at a primary drive point thereon, a vibration monitoring electrode, for monitoring the magnitude of vibration at a primary pick-off point on the structure, and an amplitude maintaining servo circuit for maintaining the amplitude of vibration at the primary pick-off point substantially constant. Preferably, the amplitude maintaining servo circuit comprises an amplitude detection circuit for detecting the amplitude of the vibration at the primary pick-off point, a comparator for comparing the detected amplitude with a reference amplitude value, and a servo circuit for varying the output of the vibration device to maintain the magnitude of vibration at the primary pick-off point substantially constant. The amplitude detection circuit comprises a voltage measuring device for measuring the voltage from the vibration monitoring device. A reference voltage is used as a reference amplitude value, and the comparator compares the voltage from the vibration monitoring device to the reference voltage. The output of the vibration device is varied by varying the voltage to the vibration device. The signal voltage to the vibration device comprises a gain control device. The sensor includes a drive current monitoring device and a frequency measuring device for monitoring the drive current and measuring the frequency of vibration of the structure (Wn). The sensor also includes a device for determining the power input at resonance. Further, the sensor includes a drive voltage measuring device for measuring the magnitude of the drive voltage. A device is provided for determining the Q factor of the vibrating structure.

The accuracy of the scale factor which is determined in accordance with the present invention ensures an accurate determination of any rate of turn which the rate sensor is undergoing about its axis.

BRIEF DESCRIPTION OF THE DRAWINGS

The present invention will now be more particularly described by way of example with reference to the accompanying drawings, in which.

DESCRIPTION OF THE PREFERRED EMBODIMENTS

Figure 1:
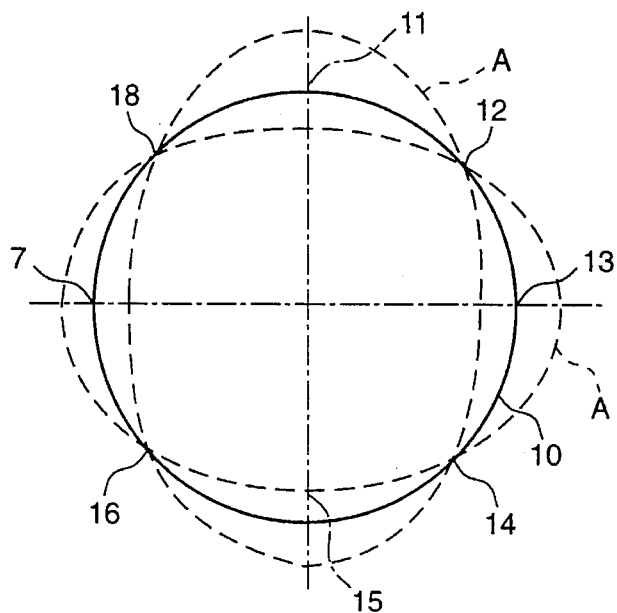
FIG. 1 is a diagrammatic representation of the primary mode vibration pattern of a piezo-electric rate sensor.
Figure 2:
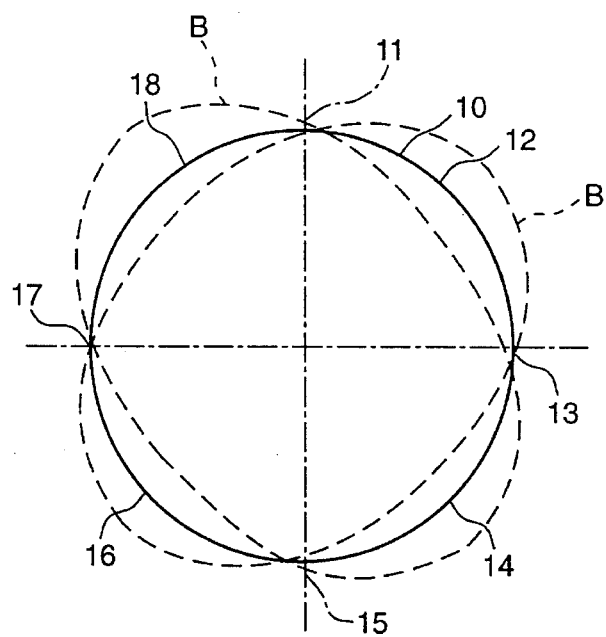
FIG. 2, is a diagrammatic representation of the secondary mode vibration pattern of a piezo-electric rate sensor.

A steady-state thin shell cylindrical vibrating rate sensor detects the rate of turn which the rate sensor is undergoing about its axis in a manner well known to those skilled in the art and therefore not described in detail herein. For instance, a cylindrical piezo-electric rate sensor is disclosed in U.S. Pat. No. 4,655,081. Howewer, in brief, the sensor is operated by the stimulation of a primary mode of vibration as shown in FIG. 1. A measure of the rate of turn which the structure is undergoing about its axis can then be determined by monitoring the magnitude of the secondary mode vibration pattern, which is shown in FIG. 2.

Figure 3:
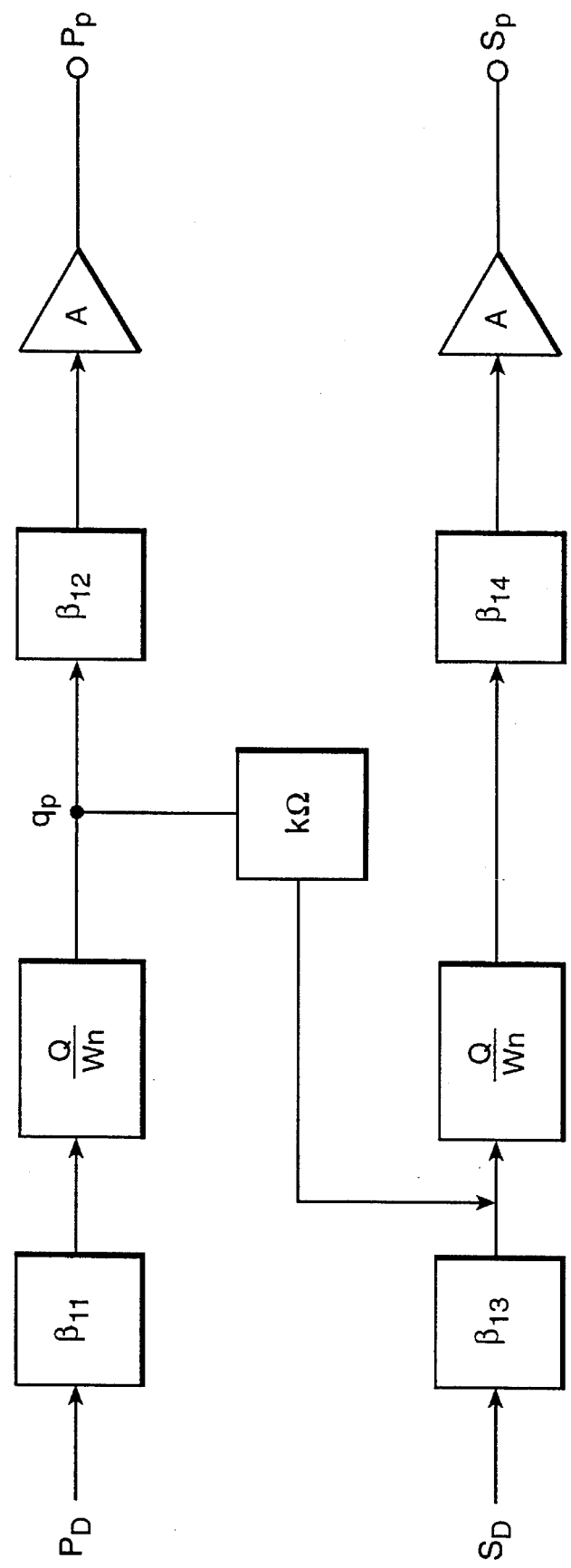
FIG. 3, is a schematic representation of a thin shell vibrating rate sensor and associated electronics from voltage in to voltage out in the steady state of the sensor and operating at a carrier frequency of Wn, where Wn is the natural resonant frequency of the sensor resonator.

FIG. 3 illustrates the steady-state primary and secondary mode signals at a vibrating carrier frequency Wn of the sensor. $P_D$ and $P_p$ respectively represent the input and output levels for the primary mode whereas $S_D$ and $S_p$ respectively represent the input and output levels for the secondary mode from which the rate of turn which the structure is undergoing about its axis is then determined. For an open loop gyroscope, about which this invention is mainly concerned, $S_D$ is set to be zero. The technique can also be applied to closed loop gyroscopes.

The piezo-electric charge coefficients $\beta_{11}$, $\beta_{12}$, $\beta_{13}$, and $\beta_{14}$ all comprise the piezo-electric charge coefficient $\beta$. The piezo-electric charge coefficient $\beta$ relates the charge generated per unit area to the stress applied to a piece of piezo-electric ceramic material and its inverse. $\beta$ is used as a general term, while terms such as $\beta_{11}$, $\beta_{12}$, etc. refer to the value of the charge constant at a particular electrode. The product $\beta_{11}\ \beta_{12}$ is present in equation 1. The gyro is desensitized to this by keeping $P_p$ constant. The present invention refers simply to the piezo-electric charge coefficient $\beta$ concerned with mechanical transducing to or from the resonator. It is only the variation with time and temperature that the present invention concerns itself with.

In FIG. 3 the boxes represent multiplicative terms which determine a relationship between output voltages and input voltages for the primary and secondary electrodes. The terms shown in the boxes include the piezo-electric charge coefficients $\beta_{11}$, $\beta_{12}$, $\beta_{13}$ and $\beta_{14}$ which are all concerned with the mechanical transducing of each of the electrodes 11–14 to the vibrating structure. Q is the resonator Q-factor of resonance around the operational frequency Wn, $\Omega$ is the applied turning rate, k is a coriolis coupling constant associated with the form of the resonator, and the variable $\dot{q}_p$ is the primary mode vibration velocity, which in combination with the angular velocity input $\Omega$ and the constant k, provide the coriolis force which drives the secondary mode.

Figure 4:
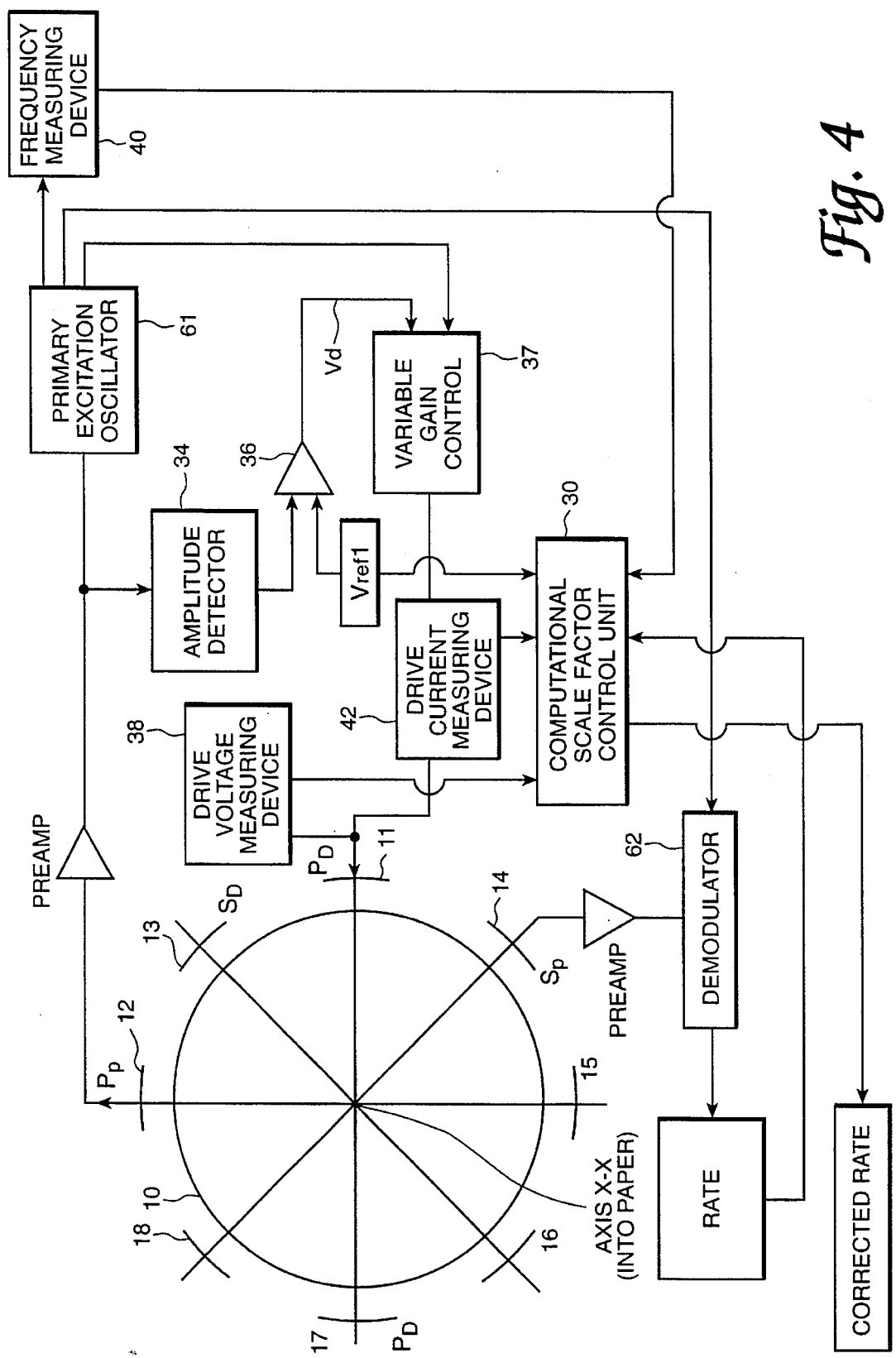
FIG. 4 is a schematic representation of a cylindrical piezo-electric rate sensor incorporating a method of and apparatus for scale factor compensation according to the present invention.

The apparatus for scale factor compensation for a piezo-electric rate sensor is shown in FIG. 4. A primary mode of vibration is set up in a cylindrical vibrating structure 10 by energizing force excitation electrodes 11, 17 to establish a double elliptical vibration pattern as shown at A in FIG. 1. The magnitude of the primary mode of vibration is detected by detecting electrodes 12 and 15 positioned orthogonal to electrodes 11 and 17 at what is referred to as the primary pick-off point. When the sensor is rotated about axis x—x the direction of the vibrating mode lags behind the vibrating structure 10, and this lagging behind corresponds to the excitation of a secondary mode of vibration having a double elliptical vibration pattern as shown at B in FIG. 2. The amplitude of the second mode is measured by using appropriate pairs of detector electrodes 14, 18 respectively. The amplitude of this signal, when demodulated by the demodulator 62 with respect to the output of the oscillator 61, is a measure of the rotation rate that is being applied to the sensor.

Excitation electrodes 11, 17 vibrate a vibrating structure 10 at a primary drive point $P_D$. The magnitude of the vibration is monitored at a primary pick-off point $P_p$ by vibration monitoring detector electrodes 12, 15.

A servo circuit maintains the amplitude of vibration at the primary pick-off point substantially constant. The amplitude maintaining servo circuit comprises: an amplitude detector 34 for measuring the voltage from the detector electrodes 12, 15; a comparator 36 for comparing the detected amplitude of vibration represented by a voltage level with a predetermined reference amplitude voltage level Vref1; and a variable gain control device 37 for varying the amplitude of the voltage signal passed to the excitation electrodes 11, 17 in accordance with a difference signal $V_d$ output from the comparator 36 to maintain the magnitude of the vibration as monitored at the primary pick-off point $P_p$, constant.

By maintaining the magnitude of vibration at the primary pick-off point $P_p$ constant, the product of piezo-electric charge coefficient $\beta_{12} \times \beta_{11}$ may then be obtained from the following equation:

$$P_d = (K_d \text{Vref1} \ W_n)/(A \ \beta_{12} \ \beta_{11} \ Q) \tag{1}$$

in which Pd is the amplitude of the drive voltage measured by the drive voltage measuring device 38; $K_d$ is a constant; Vref1 is the predetermined reference voltage; Wn is the frequency of vibration of the vibrating structure measured by the frequency measuring device 40; A is an amplifier gain and is a second constant achieved by matching the two amplifiers; $\beta_{12}$ is the piezo-electric charge co-efficient of the vibrating structure at electrode 12, which is substantially equal to that at electrode 11 for a uniformly vibrating structure; and Q is the Q factor of the vibrating structure, which may be determined from the power loss from the vibrating structure 10 and hence can be calculated from the drive voltage and elements of the drive current.

$K_d$ is a constant which is determined at calibration of the reference voltage. The constants are determined by calibration and are constant over temperature and time. They are used to determine the behavior of the temperature and time dependent coefficients Q, W and $\beta$.

With this approach the Q factor can be determined without interrupting the sensor while it is in operation because the Q factor is determined from power loss measurements. It does not involve measurements where altering the applied frequency is necessary.

A method of in-process monitoring of the Q factor is therefore provided. The Q factor is in fact known to vary considerably with temperature for a number of sintered man-made piezo-electric materials, and hence adoption of this process and other provisions of the present invention will significantly increase the accuracy of the scale factor. The Q factor can be monitored and recorded as it varies according to temperature. As the temperature changes, the scale factor can be changed accordingly.

It is to be appreciated that in this configuration, the drive voltage amplitude at the primary pick-off point $P_p$ is stabilized to have a constant amplitude such that $$P_p = kd \ \text{Vref 1} \tag{2}$$

and $$\dot{q}_p = (kd \ \text{Vref 1})/(A\beta) \tag{3}$$

Where $\dot{q}_p$ = the magnitude of the movement which gives rise to the coriolis effect in the sensor.

The scale factor SF of the vibrating rate sensor may then be determined from the following equation:

$$SF = S_p/\Omega = A \ P_d \beta_{11} \beta_{14} (Q/Wn)^2 k. \tag{4}$$

where k is again the coriolis coupling constant. Since all terms are on the right hand side of the equation are known the scale factor can be determined for all values of Q, W and $\beta$.

Where Sp=the magnitude of the secondary mode of vibration, determined by the voltage at electrode 18 with an output measuring device; $\Omega$ is the measured applied turning rate; and $\beta_{11}$ and $\beta_{14}$ are substantially equal to $\beta_{12}$ and $\beta_{11}$ as determined above.

Determination of the scale factor according to the method of the present invention enables a correction of the sensor output to be made by the computational scale factor control unit 30, ensuring a more accurate reflection of the true turning rate of which the rate sensor is undergoing about its axis. The present invention thus enables such sensors to be employed in applications requiring a higher degree of accuracy than they previously were able to fulfill.

The computational unit 30, in the preferred embodiment, separately determines the values of the power input at resonance, the Q factor of the vibrating structure 10, the piezo-electric charge co-efficient $\beta$; and the applied turning rate $\Omega$.

While the invention has been particularly shown and described with reference to a preferred embodiment and alterations thereto, it should be understood by those skilled in the art that various changes in form and detail may be made therein without departing from the spirit and scope of the invention.

What is claimed is:

1. A method of in-process scale factor compensation for a piezo-electric rate sensor comprising the steps of:

activating a vibration means to stimulate vibration of a vibratable structure at a primary drive point thereon;

monitoring a magnitude of vibration at a primary pick-off point on said structure;

comparing said magnitude of vibration at said primary pick-off point with a reference value;

varying an output of a vibration means to vary said magnitude of vibration at said primary drive point to maintain said magnitude of vibration at said primary pick-off point substantially constant;

measuring a natural resonant frequency of said vibratable structure;

monitoring a drive current and a drive voltage to said vibration means;

determining a power input to said vibratable structure from said monitored drive current and drive voltage at said natural resonant frequency;

computing said in-process scale factor based on said monitored drive current and said drive voltage to said vibration means, said natural resonant frequency of said vibratable structure, a measured magnitude of a secondary mode of vibration of said vibratable structure, and a measured applied turning rate of said vibratable structure.

2. A method according to claim 1, wherein:

said magnitude of vibration at said primary pick-off point is monitored by monitoring a signal voltage amplitude in vibration monitoring means.

3. A method according to claim 2, wherein:

a signal voltage amplitude in vibration monitoring means is compared with said reference value.

4. A method according to claim 2, wherein:

said output of said vibration means is varied by altering a voltage amplitude of a signal supplied to said vibration means at said primary drive point.

5. A method according to claim 1, further including the step of:

measuring an amplitude of said primary drive voltage.

6. A method according to claim 1, further including the step of:

determining a Q factor of said vibratable structure.

7. A method according to claim 1, further including the step of:

determining a piezo-electric charge coefficient of said vibratable structure.

8. A method according to claim 1, further including the step of:

determining a variation of said scale factor of said piezo-electric rate sensor from a calibrated value using the following equation:

Scale factor=$Sp/\Omega$=A Pd $\beta_{11}$ $\beta_{14}$ $(Q/Wn)^2$ k where A and k are constants.

9. A piezo-electric vibrating rate sensor comprising:

a vibrating member;

vibration means, for vibrating said vibrating member at a primary drive point thereon;

vibration monitoring means, for monitoring a magnitude of vibration of said vibrating member at a primary pick-off point;

amplitude maintaining means, for maintaining an amplitude of vibration of said vibrating member at said primary pick-off point substantially constant;

natural resonant frequency measuring means for measuring a natural resonant frequency of said vibrating member;

primary drive electrode current measuring means for monitoring a primary drive current to said primary drive electrode;

primary drive electrode voltage measuring means for monitoring a primary drive voltage to said primary drive electrode;

power input determining means for determining input power and a ratio of voltage between a primary pick-off electrode and a primary drive electrode from said primary drive current and said primary drive voltage;

computational scale factor control means for computing an in-process scale factor based on said primary drive current, said primary drive voltage, said natural resonant frequency of said vibrating member, a measured magnitude of a secondary mode of vibration, and a measured applied turning rate of said rate sensor.

10. A piezo-electric vibrating rate sensor according to claim 9, wherein said amplitude maintaining means comprises:

amplitude detection means for detecting said amplitude of said vibration at said primary pick-off point;

comparator means for comparing said detected amplitude of said vibration at said primary pick-off point with a reference amplitude value; and means for varying an output from said vibration means to vary said magnitude of vibration at said primary drive point to maintain said magnitude of vibration at said primary pick-off point substantially constant.

11. A piezo-electric vibrating rate sensor according to claim 9, wherein said amplitude maintaining means comprises:

amplitude detection means for detecting said amplitude of vibration at said primary pick-off point;

comparator means for comparing said detected amplitude of vibration at said primary pick-off point with a reference amplitude value; and means for varying an output of said vibration means to vary said magnitude of vibration at said primary drive point to maintain said magnitude of vibration at said primary pick-off point substantially constant;

said amplitude detection means comprises voltage measuring means for measuring an output from said vibration monitoring means;

said reference amplitude value is represented by a voltage level;

said comparator comprises means for comparing an output from said vibration monitoring means to said reference amplitude value; and said means for varying said output of said vibration means comprises means for varying an amplitude bearing voltage signal passed to said vibration means.

12. A piezo-electric vibrating rate sensor according to claim 9, wherein said amplitude maintaining means comprises:

amplitude detection means for detecting said amplitude of said vibration at said primary pick-off point;

comparator means for comparing said detected amplitude with a reference amplitude value; and means for varying said output of said vibration means to vary said magnitude of vibration at said primary drive point to maintain said magnitude of vibration at said primary pick-off point substantially constant;

said amplitude detection means comprises a voltage measuring means for measuring a voltage signal output from said vibration monitoring means;

said reference amplitude value is represented by a voltage level;

said comparator comprises means for comparing said voltage output from said vibration monitoring means to said reference voltage;

said means for varying said output of said vibration means comprises means for varying said amplitude bearing voltage signal passed to said vibration means; and said means for varying said signal passed to said vibration means comprises a gain control device.

13. A piezo-electric vibration rate sensor according to claim 9, further comprising:

drive voltage measuring means for measuring a magnitude of drive to said vibration means.

14. A piezo-electric vibration rate sensor according to claim 9, further comprising:

Q factor determining means for determining a Q factor of said rate sensor.

15. A piezo-electric vibration rate sensor according to claim 9, further comprising:

piezo-electric charge coefficient determining means for determining a piezo-electric charge coefficient of said rate sensor.

16. A piezo-electric vibration rate sensor according to claim 9, further comprising:

scale factor variation determining means for determining a variation of said scale factor of said rate sensor over temperature and time from a calibrated value, said calibrated value corresponding to a predetermined scale factor calculated from said primary drive current and said primary drive voltage.

* * * * *